(12) United States Patent
Elder

(10) Patent No.: US 10,325,700 B1
(45) Date of Patent: Jun. 18, 2019

(54) CONDENSER BUSHING, TRANSFORMER AND METHOD FOR PRODUCING A CONDENSER BUSHING

(71) Applicant: ABB Schweiz AG, Baden (CH)

(72) Inventor: Lonnie Elder, Jackson, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/835,185

(22) Filed: Dec. 7, 2017

(51) Int. Cl.
*H01B 17/58* (2006.01)
*H01F 27/02* (2006.01)
*H01F 27/28* (2006.01)
*C09D 163/00* (2006.01)

(52) U.S. Cl.
CPC ......... *H01B 17/583* (2013.01); *H01F 27/022* (2013.01); *H01F 27/2847* (2013.01); *C09D 163/00* (2013.01)

(58) Field of Classification Search
CPC . H01B 17/583; H01F 27/2847; H01F 27/022; C09D 163/00; H02G 3/0431; H02G 3/266
USPC .......................................................... 174/143
See application file for complete search history.

(56) References Cited

U.S. PATENT DOCUMENTS

| | | | |
|---|---|---|---|
| 1,511,935 A | 10/1924 | Bayles et al. | |
| 2,953,629 A | 9/1960 | Lapp | |
| 3,277,423 A * | 10/1966 | Rose | H01B 17/306 174/143 |
| 3,340,117 A * | 9/1967 | Inoue | H01B 17/26 156/184 |
| 4,123,618 A | 10/1978 | Cushing et al. | |
| 9,552,907 B2 | 1/2017 | Emilsson et al. | |
| 2008/0179077 A1 | 7/2008 | Krivda et al. | |

* cited by examiner

*Primary Examiner* — Dhiru R Patel
(74) *Attorney, Agent, or Firm* — Taft Stettinius & Hollister LLP; J. Bruce Schelkopf

(57) ABSTRACT

A cast condenser bushing includes an electrical conductor; a plurality of condenser layers disposed about the conductor, each condenser layer including a fluted, corrugated electrical insulator and a conductive sheet; and epoxy encapsulating the plurality of condenser layers and forming an epoxy casting, wherein the epoxy is disposed within and between each condenser layer.

20 Claims, 3 Drawing Sheets

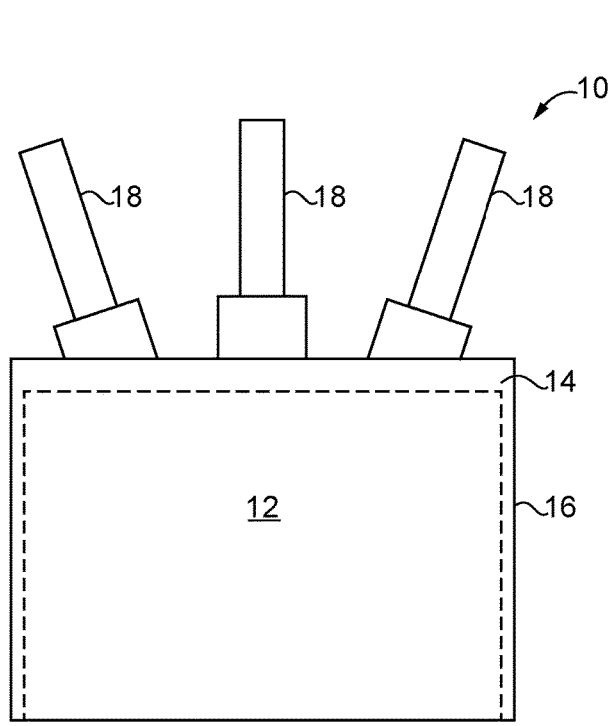
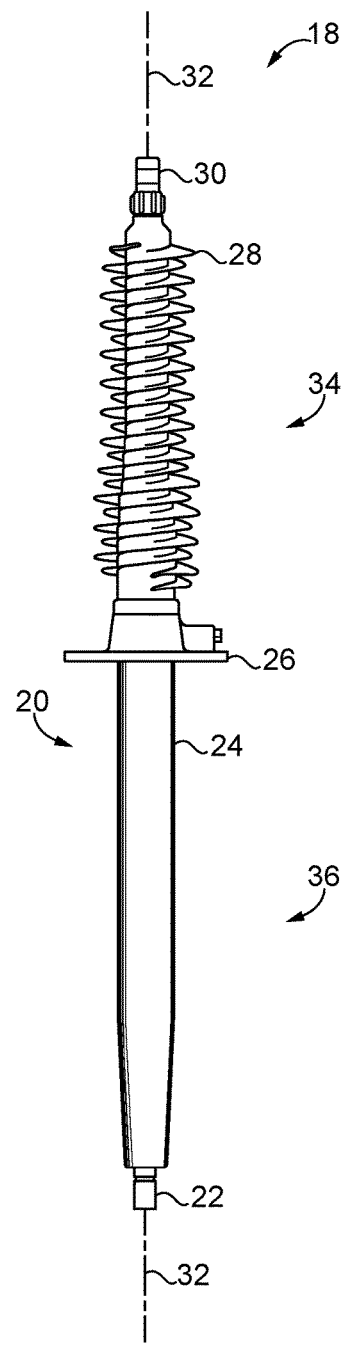
FIG. 1
FIG. 2

CONDENSER BUSHING, TRANSFORMER AND METHOD FOR PRODUCING A CONDENSER BUSHING

TECHNICAL FIELD

The present application generally relates to bushings and more particularly, but not exclusively, to cast condenser bushings

BACKGROUND

Condenser bushings remain an area of interest. Some existing condenser bushings have various shortcomings, drawbacks and disadvantages relative to certain applications. For example, in some cast condenser bushings, it may be difficult to fill a condenser core with epoxy prior to some of the epoxy increasing in viscosity and potentially prematurely hardening. Accordingly, there remains a need for further contributions in this area of technology.

SUMMARY

One embodiment of the present invention is a unique cast condenser bushing. Another embodiment is unique transformer system. Another embodiment is a unique method for producing a condenser bushing. Other embodiments include apparatuses, systems, devices, hardware, methods, and combinations for condenser bushings and other apparatuses, such as cable terminations. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIG. 1 schematically illustrates some aspects of a non-limiting example of a transformer system in accordance with an embodiment of the present invention.

FIG. 2 illustrates a side view of a condenser bushing that may be employed in the transformer system of FIG. 1 in accordance with an embodiment of the present invention.

DETAILED DESCRIPTION OF THE ILLUSTRATIVE EMBODIMENTS

Figure 3:
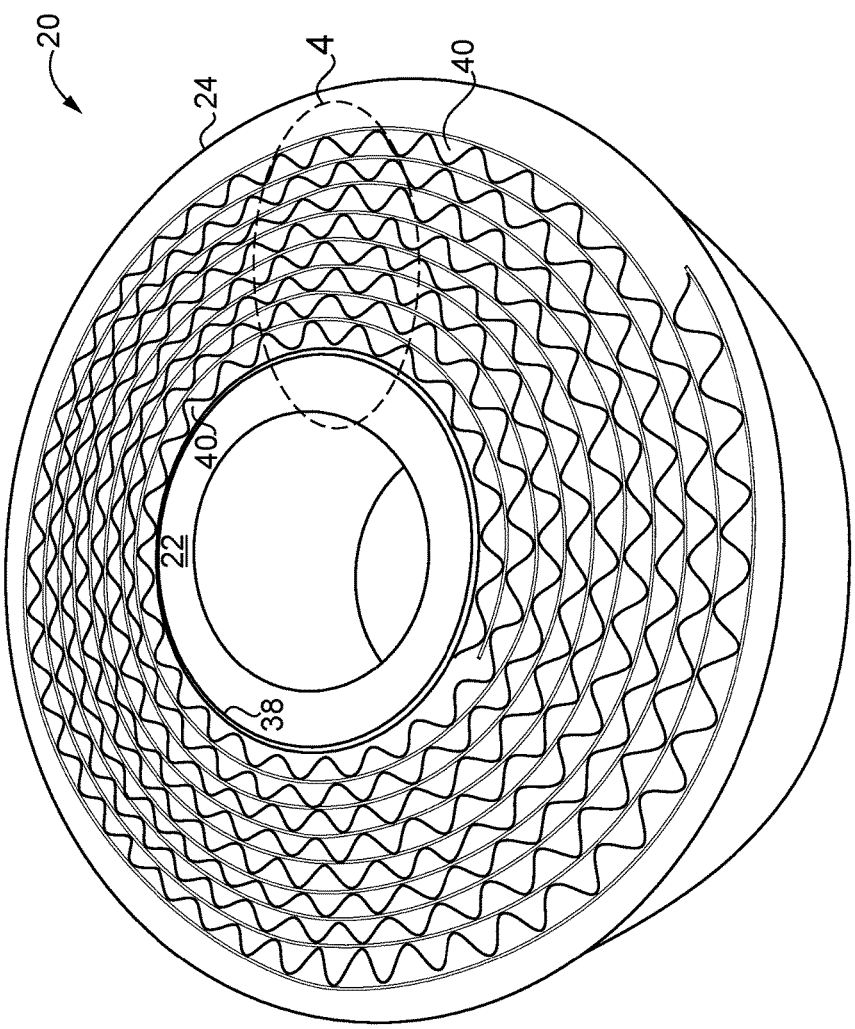
FIG. 3 schematically illustrates in an isometric sectional view some aspects of a non-limiting example of a condenser core having spirally wound condenser layers in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a transformer system 10 in accordance with an embodiment of the present invention are schematically illustrated. Transformer system 10 includes a transformer 12 disposed in an oil bath 14 in a transformer tank 16, and includes a plurality of condenser bushings 18, e.g., at least three, one for each phase, for a three-phase transformer 12. In other embodiments, transformer 12 may be a single-phase transformer having one or more condenser bushings 18. In one form, transformer 12 and condenser bushings 18 are high voltage (HV) devices, e.g., having a rated voltage of 52 kV or greater. In other embodiments transformer 12 and condenser bushing 18 may be medium voltage (MV) or low voltage (LV) devices. Condenser bushings 18 are operative to transmit the electrical output of transformer 12 to a downstream load, electrical lines or devices, and to provide control of the electric field gradient between transformer output voltage and ground or between transformer output voltage and another device, e.g., transformer tank 16.

Referring to FIG. 2, some aspects of a non-limiting example of condenser bushing 18 in accordance with an embodiment of the present invention is schematically illustrated. Condenser bushing 18 includes, among other things, a condenser core 20 having a conductor 22 disposed in an epoxy casting 24; a mounting flange 26; weather sheds 28; a top terminal 30 and a bottom terminal (not shown) for electrically coupling conductor 22 to the downstream load and transformer 12 (FIG. 1), respectively. Conductor 22 is a central structure about which condenser bushing 18 is formed. It will be understood that some embodiments may not employ a central conductor, such as conductor 22. For example, in some embodiments, a central structure in the form of a non-conducting tube or other central structure may be employed, and in other embodiments, a removable mandrel may be employed as a central structure. Condenser bushing 18 is operative to transmit electrical power for one phase of transformer 12, and is grounded, e.g., to transformer tank 16 or earth or another device.

Conductor 22 is operative to transmit current from transformer 12. In one form, conductor 22 is cylindrical. In other embodiments, conductor 22 may have another shape, e.g., another cross-sectional shape. In some embodiments, conductor 22 may be a tube. In one form, conductor 22 is a tube. In other embodiments, conductor 22 may be a solid rod. In one form, conductor 22 is formed of copper. In other embodiments, conductor 22 may be formed of aluminum. The size of conductor 22 and the material used to form conductor 22 may vary with the needs of the application, e.g., depending upon the voltage and/or current rating of the particular condenser bushing 18. In some embodiments, a layer of cork is applied about the diameter or perimeter of conductor 22, which provides a cushion to accommodate differences in thermal expansion between conductor 22 and other components of condenser bushing 18, and which also acts as a seal. In some embodiments, a layer of PTFE (polytetrafluoroethylene) tape, e.g., Teflon tape, is wrapped around the cork, e.g., to control where the epoxy bonds and where it doesn't. For example, in some embodiments it is desired that the epoxy bonds to the cork or conductor at only one or more select axial locations along the longitudinal axis of conductor 22. The PTFE tape acts as a masking agent to limit bonding to only the one or more select locations.

Epoxy casting 24 is disposed around and engages conductor 22 and/or the cork layer, encapsulating the bulk of conductor 22 along the longitudinal axis 32 of conductor 22.

In one form, epoxy casting 24 is cast to a final desired shape, and does not require any machining after the casting process, e.g., requires only cleaning up flash and parting lines. In other embodiments, epoxy casting 24 may be constructed to require machining to a desired size/configuration after the casting process. After condenser core 20 is formed, mounting flange 26 is affixed to condenser core 20, e.g., onto epoxy casting 24. Mounting flange 26 is operative to mechanically support condenser bushing 18, and to seal condenser bushing 18 against transformer tank 16. In some embodiments, mounting flange 26 may include one or more of a a voltage tap and/or a test tap for grounding the outermost conductive sheet (conductive sheets are described below). In some embodiments, when installed on transformer tank 16 (FIG. 1), one end, typically referred to as a "side" 34, e.g., an air-side 34, of condenser bushing 18 is disposed at or in one location, e.g., outside of transformer tank 16, whereas the opposite end or side 36, e.g., a transformer-side 36 is disposed at or in another location, e.g., inside of transformer tank 16. Other embodiments may be air-to-air designs, e.g., going through walls or roofs of structures. Still other embodiments may be oil-to-oil bushings used for connecting between compartments in liquid-filled apparatuses, such as transformers. Yet other embodiments may be liquid-to-gas designs, e.g., to connect transformers to SF6 insulated systems.

Weather sheds 28 are installed on air-side 34 of condenser core 20, e.g., after mounting flange 26 is installed onto condenser core 20. In one form, weather sheds 28 are silicone rubber weather sheds, e.g., formed of a high temperature vulcanizing silicone rubber. In some embodiments, weather sheds 28 are formed on epoxy casting 24 of condenser core 20, e.g., by helically extruding weather sheds 28 onto the air-side 34 of epoxy casting 24 of condenser core 20. In other embodiments, weather sheds 28 may be formed in other manners. In some embodiments weather sheds 28 may be porcelain or another type of polymeric weather shed. Some embodiments may not include weather sheds.

Figure 4:
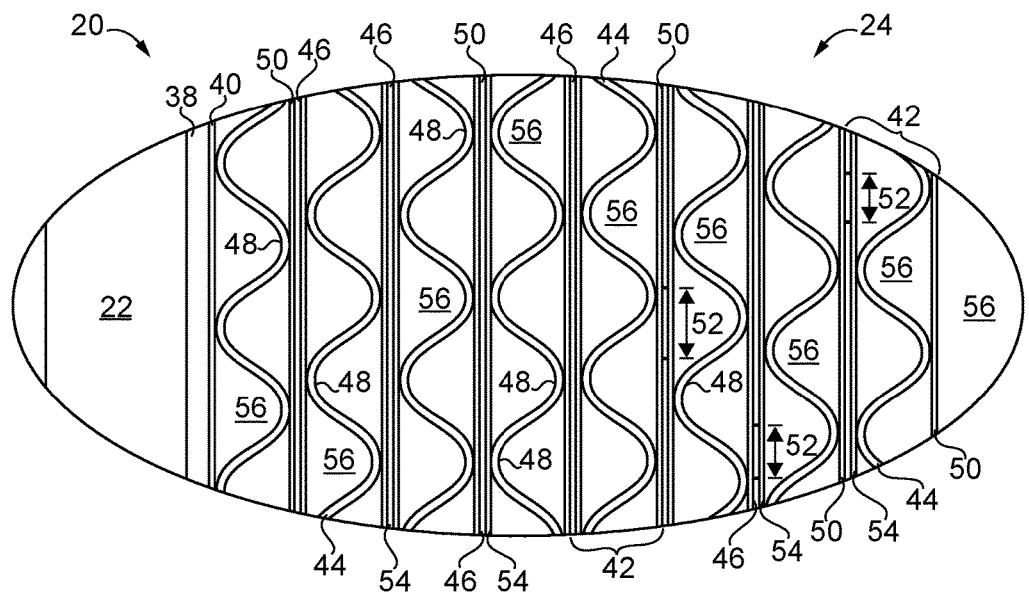
FIG. 4 schematically illustrates an enlarged laid out view of the section of FIG. 3.

Referring to FIGS. 3 and 4, some aspects of a non-limiting example of condenser core 20 in accordance with an embodiment of the present invention are illustrated in a sectional view. Condenser core 20 includes conductor 22, within epoxy casting 24, a layer of cork 38 disposed about conductor 22 for a desired length, a layer of PTFE 40, e.g., Teflon tape, disposed about cork 38 along for one or more desired lengths along the longitudinal axis of conductor 22, leaving one or more gaps at desired locations. Some embodiments may not include the cork 38 layer and/or the layer of PTFE 40 tape, or may use one or more other materials in place of cork and/or PTFE. Condenser core 20 also includes, cast within and part of epoxy casting 24, a plurality of condenser layers 42, which may also be referred to as laminations 42, disposed about and extending along the longitudinal axis 32 of conductor 22.

Each condenser layer or lamination 42 includes a layer of a fluted, corrugated electrical insulator 44 and a layer of a conductive sheet 46. Whereas electrical insulator 44 provides electrical insulation, it will be understood that in some embodiments, a substantial amount of electrical insulation is provided by the epoxy, which in some embodiments may provide substantially more insulation than electrical insulator 44. In some embodiments, both the epoxy and the electrical insulator 44 are considered primary insulation materials, e.g., since they are both responsible for providing insulation to condenser 18.

It will be understood that conductive sheet 46 may take one or more of various forms, and may vary with the needs of the application, and may include material forms such as a conductive foil, a conductive paper, a conductive wire mesh, and/or any type of sheet(s) of conductive material that may be layered, e.g., in the manner described herein. The conductive sheets 46 in condenser bushing 18 are in the form of individual sheets—a plurality of such sheets are used in each condenser core 20. The length or width of each layer of fluted, corrugated electrical insulator 44 and of each layer of conductive sheet 46 in the circumferential or tangential direction may vary about bushing 18. In some embodiments, a circumferential or tangential gap is left between each succeeding conductive sheet 46, e.g., so that one such conductive sheet 46 is not shorted against an adjacent such conductive sheet 46. Conductive sheets 46 are constructed to generate a desired electric field gradient, e.g., between conductor 22 voltage and ground or another device. In one form, conductive sheet 46 is an aluminum foil. In other embodiments, a copper foil may be used. In still other embodiments, other materials may be employed, e.g., as mentioned above. In one form, fluted, corrugated electrical insulator 44 is formed of electrical grade kraft paper, e.g., a fluted, corrugated electrical kraft paper. In other embodiments, other materials may be employed.

The corrugations forming flutes 48 are shaped similar to the corrugations/flutes that are found in conventional corrugated cardboard, e.g., used to make cardboard boxes, except that the sizes, e.g., the as-installed radial height and circumferential extent, or flute pitch, are selected to provide a desired radial density of conductive sheets 46 and achieve a desired mechanical strength, a desired dielectric strength between conductive sheets, and a desired electric field gradient between conductor 22 and ground or another potential. The shape of the corrugations/flutes may be, for example, sinusoidal or substantially sinusoidal. In other embodiments, other shapes may be employed, for example and without limitation, shapes that are substantially triangular, trapezoidal, or square. In one form, the corrugations/flutes are parallel to each other. In other embodiments, the corrugations/flutes may not be parallel to each other, or only some corrugations/flutes may be parallel to each other.

The flutes 48 of fluted, corrugated electrical insulator 44 extend in the direction of longitudinal axis 32 (FIG. 2) of conductor 22, i.e., are parallel to each other and to longitudinal axis 32. Each flute or corrugation extends parallel to longitudinal axis 32 from one end of the fluted, corrugated electrical insulator 44 of a particular layer to the opposite end of a particular layer. For example, in some embodiments, from the air side 34 of condenser bushing 18, to the transformer-side 36, e.g., from one end of the epoxy casting 24 to the opposite end, e.g., almost from one end of conductor 22 to the opposite end. In one form, the electrical grade kraft paper used to form fluted, corrugated electrical insulator 44 is not creped, i.e., is not crepe paper. Indeed, crepe paper, e.g., creped electrical grade kraft paper, includes creases and folds, but the creases and folds are not parallel to each other; each fold or crease does not extend from one end of the crepe paper sheet to the other, e.g., from one end of a bushing to another; and the folds and creases are not flutes or corrugations as those terms are conventionally understood; and the folds and creases are not flutes or corrugations within the context of the present specification and claims. Crepe paper is not fluted, corrugated paper as those terms are conventionally understood, and as those terms are used within the context of the present application. Although some embodiments may employ crepe paper as the base paper from which the fluted, corrugated paper is made, the crepe paper must be fluted and corrugated the same as the non-crepe paper in order to be used for fluted, corrugated electrical insulator 44 in accordance with embodiments of the present invention. The corrugations/flutes of fluted, corrugated electrical insulator 44 are similar in shape to corrugated cardboard, but are made using another material, e.g., electrical grade paper, for instance, electrical grade kraft paper. In one form, the flute 48 size is approximately 2 millimeter high by approximately 2 millimeter average width (or circumferential extent, as installed). In other embodiments, other flute sizes may be employed, for example, 1.5 millimeter-3 millimeter in height and/or width in some embodiments, and other sizes in other embodiments. By using a fluted, corrugated construction with relatively large flute/corrugation size, epoxy flows more freely during the casting process, which reduces the likelihood of voids being formed, thus reducing manufacturing defects and scrap, and, because it fills the casting mold more quickly, allows the production of larger cast condenser bushings 18, since inadvertent or undesired increases in viscosity or solidification of the epoxy is reduced or eliminated, and the flow rate of epoxy can thus be increased. Stated differently, by using a fluted, corrugated construction with a relatively large flute/corrugation size, epoxy flows more freely during the casting process, and the flow rate of the epoxy can thus be increased, as compared to previous constructions. This allows for faster filling of the casting mold, which in turn allows filling to be completed before the undesired, but unavoidable, increase in viscosity due to curing of the resin becomes problematic for filling. As compared with other constructions, this improvement may, in some embodiments, be used to: reduce process time; reduce defects; allow for the use of filled epoxy; and/or allow for the production of larger size cast condenser/epoxy bodies or bushings 18. The easier filling may allow for better control of the process, and reduces the likelihood of voids being formed, thus reducing manufacturing defects and scrap.

In some embodiments, fluted, corrugated electrical insulator 44 is a single-face construction, having a liner 50 adhered to the flutes or corrugations of the fluted, corrugated electrical insulator 44. In other embodiments, liner 50 may wound in with the fluted, corrugated electrical insulator 44, but not adhered to it. In one form, liner 50 is electrical grade kraft paper. In other embodiments, other materials may be used. In one form, liner 50 is not creped. In other embodiments, liner 50 may be creped.

Conductive sheets 46 are in the form of individual sheets disposed between adjacent layers of fluted, corrugated electrical insulator 44 and wrapped around each layer of fluted, corrugated electrical insulator 44, with the leading edge and trailing edge of conductive sheet 46 being located at desired circumferential positions, e.g., to achieve a desired capacitive grading effect for condenser bushing 18.

In some embodiments, e.g., the embodiment of FIGS. 3 and 4, a continuous length of fluted, corrugated electrical insulator 44 is wrapped or wound around conductor 22 (e.g., and cork 38 and PTFE tape 40 in embodiments so equipped) in a spiral fashion, with individual conductive sheets 46 being spaced apart from each other at desired intervals, e.g., having gaps 52 between circumferentially adjacent conductive sheets 46. In such embodiments, condenser layers 42 are in the form of a spiral. In other embodiments, lengths of fluted, corrugated electrical insulator 44 may be cut to size so as to wrap single layers of fluted, corrugated electrical insulator 44 with conductive sheets 46 about conductor 22 (e.g., and cork 38 and PTFE tape 40 in embodiments so equipped), wherein each fluted, corrugated electrical insulator layer 44 and condenser layer 42 is cylindrical, not spiral. In such embodiments, joints are formed between the cut ends of the lengths fluted, corrugated electrical insulator 44 that form each individual cylindrical layer. In both embodiments, individual of conductive sheets 46 are spaced apart from each other at desired intervals.

In some embodiments, each condenser layer 42 may include a non-conductive layer 54 disposed between conductive sheet 46 and fluted, corrugated electrical insulator 44, e.g., operative to support conductive sheet 46 to prevent portions of the conductive sheets 46 from displacing into the flutes of fluted, corrugated electrical insulator 44. In one form, the material of non-conductive layer 54 is a synthetic open-mesh fabric. In other embodiments, other materials may be employed to form non-conductive layer 54, e.g., electrical grade kraft paper, which may or may not be creped, depending upon the embodiment. Other embodiments may not include a non-conductive layer 54.

Once the condenser layers 42 are installed around conductor 22 (and cork 38 and PTFE 40 in embodiments so equipped), the assembly is placed into a mold, and epoxy 56 (resin) is introduced into the mold, e.g., in a vacuum, wherein the epoxy 56 flows through and between each condenser layer 42, encapsulating the layers and being interspersed within and between each layer and between the layers and conductor 22 (and cork 38 and PTFE 40 in embodiments so equipped), which is then cured, forming epoxy casting 24, which has an outer shell of cured epoxy 56. In one form, epoxy 56 is silica filled, e.g., 50% silica fill. In other embodiments, other fillers may be used. In still other embodiments no filler may be used. In some embodiments, other curable resins may be used, for example and without limitation, polyester or other castable resins.

Figure 5:
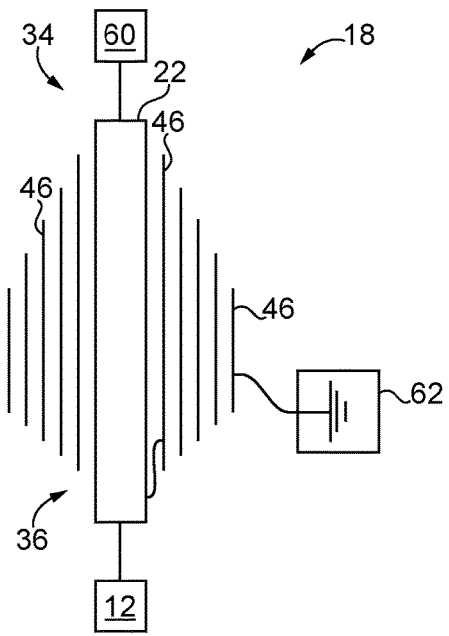
FIG. 5 schematically illustrates some aspects of a non-limiting example of condenser bushing electrical connections in accordance with an embodiment of the present invention.

Referring to FIG. 5, some aspects of a non-limiting example of condenser bushing 18 electrical connections in accordance with an embodiment of the present invention are schematically illustrated. Conductor 22 is electrically coupled on transformer-side 36 to transformer 12, and to downstream electrical load 60 on air-side 34. The innermost conductive sheet 46 is electrically coupled to conductor 22. The outermost conductive sheet 46 is electrically coupled to ground or another device 62, e.g., such as transformer tank 16.

Embodiments of the present invention include a cast condenser bushing, comprising: an electrical conductor; a plurality of condenser layers disposed about the conductor, each condenser layer including a fluted, corrugated electrical insulator and a conductive sheet; and an epoxy encapsulating the plurality of condenser layers and forming an epoxy casting, wherein the epoxy is disposed within and between each condenser layer.

In a refinement, the electrical conductor includes a longitudinal axis; and wherein the fluted, corrugated electrical insulator includes flutes, wherein the flutes extend parallel to the longitudinal axis.

In another refinement, the layer of fluted, corrugated electrical insulator is formed of an electrical grade kraft paper.

In yet another refinement, the electrical grade kraft paper is not creped.

In still another refinement, the layer of fluted, corrugated electrical insulator is a single-faced construction having a liner adhered to or wound together with flutes of the corrugated electrical grade kraft paper.

In yet still another refinement, each condenser layer includes a nonconductive layer disposed adjacent to the conductive sheets and operative to support each conductive sheet.

In a further refinement, the condenser layers are spirally wound about the conductor.

In a yet further refinement, an inner most conductive sheet is electrically coupled to the conductor.

In a still further refinement, the condenser is constructed to electrically couple an outermost conductive sheets to an electrical ground and/or to another electrical circuit or device.

Embodiments of the present invention include a transformer system, comprising: a transformer; and a condenser bushing, the condenser bushing including: a conductor, the conductor having a longitudinal axis; a plurality of laminations disposed about the longitudinal axis of the conductor, each lamination including: a layer of fluted, corrugated electrical grade paper disposed about the conductor, the fluted, corrugated electrical paper having flutes extending parallel to the axis of the conductor; and a conductive sheet; and cast epoxy encapsulating the plurality of layers and interspersed within and between the plurality of layers and between the layers and the conductor.

In a refinement, the electrical conductor includes a longitudinal axis; and wherein the fluted, corrugated electrical grade paper includes flutes that are parallel to the longitudinal axis.

In another refinement, the layer of fluted, corrugated electrical grade paper is formed of an electrical grade kraft paper.

In yet another refinement, the electrical grade kraft paper is not creped.

In still another refinement, the layer of fluted, corrugated electrical grade paper is a single-faced construction having a liner adhered to or wound together with flutes of the corrugated electrical grade kraft paper.

In yet still another refinement, each lamination includes a nonconductive layer disposed adjacent to the conductive sheet and adjacent to a next layer of fluted, corrugated electrical grade paper, and operative to support the conductive sheet.

In a further refinement, the plurality of laminations is spirally wound about the conductor.

In a yet further refinement, an innermost conductive sheet is electrically coupled to the conductor.

In a still further refinement, the condenser bushing is constructed to electrically couple an outermost of conductive sheet to an electrical ground and/or to another electrical circuit or device.

Embodiments of the present invention include a method for producing a condenser bushing, comprising: wrapping a plurality of condenser laminations about a conductor, each lamination including a layer of a fluted, corrugated electrical insulator and a layer of a conductive sheet; electrically coupling an innermost layer of the conductive sheet to the conductor; impregnating the alternating layers with an epoxy to encapsulate the plurality of alternating layers with the epoxy and dispose the epoxy within and between the alternating layers; and curing the epoxy.

In a refinement, the layer of fluted, corrugated electrical insulator is a single-faced construction of a non-creped electrical grade kraft paper.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A cast condenser bushing, comprising:
    an electrical conductor;
    a plurality of condenser layers disposed about the conductor, each condenser layer of the plurality of condenser layers including a fluted, corrugated electrical insulator and a conductive sheet; and
    an epoxy encapsulating the plurality of condenser layers and forming an epoxy casting, wherein the epoxy is disposed within and between each condenser layer of the plurality of condenser layers.

2. The condenser bushing of claim 1, wherein the electrical conductor includes a longitudinal axis; and wherein the fluted, corrugated electrical insulator includes flutes, wherein the flutes extend parallel to the longitudinal axis.

3. The condenser bushing of claim 1, wherein the layer of fluted, corrugated electrical insulator is formed of an electrical grade kraft paper.

4. The condenser bushing of claim 3, wherein the electrical grade kraft paper is not creped.

5. The condenser bushing of claim 3, wherein the layer of fluted, corrugated electrical insulator is a single-faced construction having a liner adhered to or wound together with flutes of the corrugated electrical grade kraft paper.

6. The condenser bushing of claim 1, wherein each condenser layer includes a nonconductive layer disposed adjacent to the conductive sheets and operative to support each conductive sheet.

7. The condenser bushing of claim 1, wherein the condenser layers are spirally wound about the conductor.

8. The condenser bushing of claim 1, wherein an inner most conductive is electrically coupled to the conductor.

9. The condenser bushing of claim 1, wherein the condenser is constructed to electrically couple an outermost conductive sheet to an electrical ground and/or to another electrical circuit or device.

10. A transformer system, comprising:
    a transformer; and
    a condenser bushing, the condenser bushing including:
        a conductor, the conductor having a longitudinal axis;
        a plurality of laminations disposed about the longitudinal axis of the conductor, each lamination of the plurality of laminations including:

a layer of a fluted, corrugated electrical grade paper disposed about the conductor, the fluted, corrugated electrical paper having flutes extending parallel to the axis of the conductor; and a layer of a conductive sheet; and a cast epoxy encapsulating the plurality of laminations and interspersed within and between each lamination of the plurality of laminations and between the plurality of laminations and the conductor.

11. The transformer system of claim 10, wherein the electrical conductor includes a longitudinal axis; and wherein the fluted, corrugated electrical grade paper includes flutes that are parallel to the longitudinal axis.

12. The transformer system of claim 10, wherein the layer of fluted, corrugated electrical grade paper is formed of an electrical grade kraft paper.

13. The transformer system of claim 12, wherein the electrical grade kraft paper is not creped.

14. The transformer system of claim 12, wherein the layer of fluted, corrugated electrical grade paper is a single-faced construction having a liner adhered to or wound together with flutes of the corrugated electrical grade kraft paper.

15. The transformer system of claim 10, wherein each lamination of the plurality of laminations includes a non-conductive layer disposed adjacent to the conductive sheet and adjacent to a next layer of fluted, corrugated electrical grade paper, and operative to support the conductive sheet.

16. The transformer system of claim 10, wherein the plurality of laminations is spirally wound about the conductor.

17. The transformer system of claim 10, wherein an innermost conductive sheet is electrically coupled to the conductor.

18. The transformer system of claim 10, wherein the condenser bushing is constructed to electrically couple an outermost of conductive sheet to an electrical ground and/or to another electrical circuit or device.

19. A method for producing a condenser bushing, comprising:

wrapping a plurality of condenser laminations about a conductor, each lamination of the plurality of condenser laminations including a layer of a fluted, corrugated electrical insulator and a layer of a conductive sheet, to form a plurality of alternating layers of the fluted, corrugated electrical insulator and of the conductive sheet;

electrically coupling an innermost layer of the conductive sheet to the conductor;

impregnating the plurality of alternating layers with an epoxy to encapsulate the plurality of alternating layers with the epoxy and dispose the epoxy within and between alternating layers of the plurality of alternating layers; and curing the epoxy.

20. The condenser of claim 19, wherein the layer of fluted, corrugated electrical insulator is a single-faced construction of a non-creped electrical grade kraft paper.

* * * * *